United States Patent [19]

Schönafinger et al.

[11] 4,271,234
[45] * Jun. 2, 1981

[54] IRON OXIDE MAGNETIC PIGMENTS FOR THE PRODUCTION OF MAGNETIC COATINGS

[75] Inventors: Eduard Schönafinger, Ludwigshafen; Paul Deigner, Weisenheim; Manfred Ohlinger, Frankenthal; Helmut Jakusch, Ludwigshafen; Jürgen Amort, Troisdorf-Sieglar; Heinz Nestler, Troisdorf-Eschmar; Claus-Dietrich Seiler, Rheinfelden; Otto Ambros, Mannheim, all of Fed. Rep. of Germany

[73] Assignee: Dynamit Nobel Aktiengesellschaft, Troisdorf, Fed. Rep. of Germany

[ * ] Notice: The portion of the term of this patent subsequent to Nov. 2, 1996, has been disclaimed.

[21] Appl. No.: 8,146

[22] Filed: Jan. 31, 1979

Related U.S. Application Data

[60] Division of Ser. No. 848,437, Nov. 3, 1977, Pat. No. 4,169,912, which is a continuation of Ser. No. 729,445, Oct. 4, 1976, abandoned.

[30] Foreign Application Priority Data

Oct. 2, 1975 [DE] Fed. Rep. of Germany ....... 2543962

[51] Int. Cl.³ ........................... B32B 5/16; B32B 9/04
[52] U.S. Cl. .................................... 428/405; 360/134; 427/199; 427/219; 428/145; 428/148; 428/329; 428/447; 428/450; 428/451; 106/304; 106/308 Q; 428/900; 428/694; 252/62.56

[58] Field of Search ............... 428/403, 329, 148, 145, 428/149, 226, 323, 446, 450, 451, 477, 539, 900, 447, 405; 427/199, 219; 360/134

[56] References Cited

U.S. PATENT DOCUMENTS 3,996,407 12/1976 Von Gross et al. ................. 428/329
4,169,912 10/1979 Schonafinger et al. ............. 428/145

FOREIGN PATENT DOCUMENTS 1147518 4/1969 United Kingdom ..................... 428/329

Primary Examiner—Thomas J. Herbert, Jr.
Attorney, Agent, or Firm—Sprung, Felfe, Horn, Lynch & Kramer

[57] ABSTRACT

An iron oxide pigment having a coating of a silane of the formula $$R_n Si(OR')_{4-n}$$

wherein
R is an, in some cases, branched or oxygen-bridge-containing alkyl or alkenyl moiety of 1 to 18 carbon atoms, or an aryl moiety,
R' is an, in some cases, branched and, in some cases, oxygen-bridge-containing alkyl moiety of 1 to 8,
n=1 to 3, or a hydrolysis product thereof; a magnetic tape containing such coated iron oxide pigment and a process for coating such iron oxide pigment. There is particularly disclosed the treatment of iron oxide magnetic pigments to thereby improve their wear resistance and dispersibility in organic mediums.

23 Claims, No Drawings

IRON OXIDE MAGNETIC PIGMENTS FOR THE PRODUCTION OF MAGNETIC COATINGS

This is a division, of application Ser. No. 848,437, filed Nov. 3, 1977, now U.S. Pat. No. 4,169,912 which is a continuation of application Ser. No. 729,445, filed Oct. 4, 1976, now abandoned.

BACKGROUND OF THE INVENTION

1. Field of the Invention

This invention relates to coated iron oxide pigments particularly iron oxide magnetic pigments and the utilization of such coated iron oxide magnetic pigments in magnetic tape. More particularly, this invention relates to the preparation and utilization of pretreated iron oxide magnetic pigments which have improved stability against mechanical attack such as attrition. This invention is particularly directed to improving the dispersibility of iron oxide magnetic pigments so that they can be readily dispersed within magnetic coatings to provide coatings having improved magnetic and sound properties.

2. Discussion of the Prior Art

It is known that iron oxide pigments can be hydrophobized by means of alkyl halogen silanes at a temperature above 200° C. in the presence of water vapor, approximately the following reaction taking place:

$$R-SiCl_3 + H_2O \rightarrow RSi(OH)_3 + 3\ HCl.$$

This process, however, is not satisfactory because, among other reasons, large amounts of hydrochloric acid have to be disposed of in such preliminary treatment with alkyl trichlorosilanes (German "Offenlegungsschrift" No. 1,767,973). In the same "Offenlegungsschrift" it is stated that hydrophobation out of aqueous solution has not been successful, or has succeeded to an unsatisfactory degree.

Pretreatment of iron oxide with polysiloxanes or with dialkyl or dialkylene silanes does not give satisfactory results, either (Japanese Patent Publication 7 4014-749).

It is an object of this invention, therefore, to provide a process for disposing a hydrophobic coating on an iron oxide pigment. It is a further object of this invention to provide a silica-containing coating on an iron oxide magnetic pigment to thereby improve the pigment's resistivity against mechanical attack such as attrition. It is a further object of this invention to improve the dispersibility of such pigments in an organic medium such as those employed in magnetic coatings.

SUMMARY OF THE INVENTION

Broadly, this invention contemplates an iron oxide pigment at least partially coated with a silane of the formula $$R_nSi(OR')_{4-n}$$

wherein R is an, in some cases, branched or oxygen-bridge-containing alkyl or alkenyl moiety of 1 to 18 carbon atoms, or an aryl moiety, R' is an, in some cases, branched and, in some cases, oxygen-bridge-containing alkyl moiety of 1 to 8, n = 1 to 3, or a hydrolysis product thereof.

In another embodiment of this invention, there is contemplated a magnetic tape comprising an iron oxide pigment which iron oxide pigment is at least partially coated with the aforenoted silane or its hydrolysis product.

In still another embodiment of this invention, there is contemplated a process for improving the dispersibility and increasing the wear resistance of a finely divided iron oxide pigment, especially an iron oxide magnetic pigment which comprises suspending said iron oxide pigment in an organic or aqueous medium containing a silane of the formula $$R_nSi(OR')_{4-n}$$

wherein

R is an, in some cases, branched or oxygen-bridge-containing alkyl or alkenyl moiety of 1 to 18 carbon atoms, or an aryl moiety, R' is an, in some cases, branched and, in some cases, oxygen-bridge-containing alkyl moiety of 1 to 8, n = 1 to 3, or its hydrolysis product until at least a portion of said iron oxide pigment is coated with said silane or its hydrolysis product and thereafter drying the so-treated iron oxide pigment at 50°–200° C. Generally speaking, the iron oxide pigment is dried after it is removed from the organic or aqueous medium.

It is therefore seen that the present invention is concerned with the treatment of iron oxide pigments in such a manner that, when their dispersions are dissolved in binding agents, such as those employed in magnetic coatings, there is provided magnetic coatings having improved properties. These improved properties include improvement with respect to orientation factors, improved surface smoothness and better wear characteristics.

Thus, the problems which the prior art has faced are solved to a great extent in accordance with the present invention by suspending in an organic and/or aqueous medium the silane of the above formula. Referring to the formula, R is a straight or branched alkyl group of 1 to 8 carbon atoms which can contain an oxygen atom in the chain. Alternatively, R is a $C_2$–$C_{18}$ alkenyl group which is branched or straight and can also contain an oxygen atom in the chain. The moiety R can also be an aryl group, especially a $C_6$–$C_{18}$ carbocyclic aryl group.

In carrying out the process, it has been found preferable to remove the iron oxide pigments from the organic and/or aqueous medium prior to drying the same, the drying being effected at a temperature of about 50° to 200° C. Spray drying has proven to be an especially effective method for drying the coated iron oxide pigments.

In many cases it is advantageous if the moiety R of the above-given formula contains a functional group, such as an amino, epoxy, mercapto or polysulfide group, with an N-aminoalkyl substitution if desired, preferably one which can react with groupings in the binding agent or contains a $CH_2=C$ group such as an acrylic or methacrylic group. Examples of usable silanes are: $C_1$ to $C_6$-alkyltrimethoxy-(or ethoxy)-silane, glycidyloxypropyltrimethoxysilane, methacryloxyethyltriethoxysilane, $S_2[(CH_2)_3-Si(OH_3)_3]$.

For the treatment, the pigment is suspended in an acid or alkaline organic and/or aqueous silane solution, stirred for a relatively long time, at a higher temperature if desired (20° to 80° C.), such that a uniform distribution of the pigment in the suspension is achieved; then the pigment is filtered out. The pigment is then dried at temperatures of 50° to 200° C., preferably at 100° to 170° C., the drying time amounting to at least ½ hour, but preferably to 2 to 10 hours.

Alcohols of 1 to 4 carbon atoms or low ketones or chlorinated hydrocarbons have proven to be good organic media for the treatment of the magnetic pigments. On account of their greater safety in the pretreatment and drying operations, it is recommendable to use aqueous organic solutions or water itself as the suspending agent for the magnetic pigments. It is desirable to adjust the pigment suspension, by the addition of acid, such as acetic acid, or a base, such as an aqueous ammonia solution or soda lye, to a slightly acid pH (preferably about 2 to 6) or to a basic pH (preferably about 7.5 to 10). The addition of acid or base to the organic and/or aqueous suspending agent can take place before the addition of the silane and pigment or thereafter.

The silane hydrolyzes in the treatment, and the polar groups of the hydrolysis products can enter into physio-chemical bonds with the reactive parts of the pigment surface. In the drying of the treated pigments that follows, free OH groups of the silanols can form siloxane bridges with one another.

The amount of the silane or of the hydrolysis products of the silane, which is generally used for the pretreatment of iron oxide magnetic pigments, can be between 0.5 and 40 weight-percent with respect to the amount of iron oxide pigment used, depending on the specific surface area of the pigment (measured by the BET method, cf. Z. anal. Chem., Vol. 238 (1968), pp. 187 to 193). The dry iron oxide content of the suspension should amount to between 5 and 50% by weight.

Suitable iron oxide pigments are finely divided ferromagnetic iron oxides, which, if desired, can be provided in the course of their production with an inorganic protective coating. Finely divided, acicular gammairon-(III) oxide is preferred.

The iron oxide magnetic pigments treated in accordance with the invention can be made by known methods into dispersions of the pigments in binding agents and solvents for the production of magnetic coatings and for the manufacture of magnetic recording media. In the production of magnetic coatings, the ratio of the magnetic pigment to the binding agent or binding agent mixture generally amounts to from 2 to 10, and especially 3 to 5, parts by weight of magnetic pigments to one weight-part of binding agent or binding agent mixture.

The substances known to be used as binding agents for magnetic pigment dispersions can be utilized for the purpose, such as vinyl chloride-vinyl acetate copolymers and their commercial hydrolysis products containing approximately 5 to 20 weight percent of vinyl alcohol units, copolymers of vinyl chloride with low esters of maleic or fumaric acid, polyvinylformals, copolyamides, mixtures of elastomers of virtually isocyanate-free polyester urethanes with vinyl chloride-vinyl acetate copolymers, vinylidene chloride-acrylonitrile copolymers or polyesters, or with phenoxy resins, such as those described in German "Auslegeschrift" No. 1,282,700, U.S. Pat. No. 3,144,352, German "Auslegeschrift" No. 1,269,661, and German "Auslegeschrift" No. 1,295,011, the disclosures of which are hereby specifically incorporated herein by reference, or with polyvinylformal. A highly suitable polyester urethane, which is soluble, thermoplastic and virtually free of hydroxyl groups is one prepared from an aliphatic dicarboxylic acid of 4 to 6 carbon atoms, such as adipic acid, an aliphatic diol of 4 to 10 carbon atoms, such as butanediol-1,4, and a diisocyanate of 6 to 20 carbon atoms, such as 4,4'-diisocyanato-diphenylmethane. Suitable polyvinylformals have a content of at least 65 and preferably 80 to 88 percent of the weight of the polymer in vinylformal units, a content of vinyl alcohol units (preferably from 5 to 13 weight percent), and a content of vinyl acetate units (preferably 7 to 15 weight percent). Examples of suitable polyester urethanes are those described in German "Auslegeschrift" No. 1,106,959, the disclosure of which is hereby specifically incorporated herein by reference, and especially the corresponding products prepared with the use of branched glycols of 4 to 12 carbon atoms, such as neopentylene glycol, as the only glycols, or mixed with linear glycols, such as ethylene glycol or butanediol-1,4.

The conventional stiff and flexible support materials can be used as nonmagnetic and non-magnetizable substrates for sound recording coatings, especially films of linear polyesters, such as polyethylene terephthalate, generally in thicknesses of 5 to 50, and especially of approximately 10 to 35 μm. The substrate can be one made from an isocyanate-free polyester urethane with a vinyl chloride-vinyl acetate copolymer, a vinylidene chloride-acrylonitrile copolymer or a polyester of a phenoxy resin.

The magnetic coatings can be produced in a known manner. It is desirable to filter the magnetic dispersion, previously prepared in a dispersing machine, such as a barrel-type or agitator-type ball mill, from the magnetic pigment and a solution of the binding agent with the addition of dispersants and other conventional additives, and then to apply it, by means of a straight-edge film casting machine, for example, in one or more thin layers to the nonmagnetic support, or, in a thin coating to a magnetic recording support already provided with a magnetic layer. As a rule, a magnetic orientation of the magnetic pigments in the applied coating is then performed before the fluid coating mixture is dried on the support, the drying being best accomplished at temperatures of about 50° to 90° C. for about 2 to 5 minutes if coatings on thermoplastic supports, such as films for example, are involved. By passing the resultant magnetic coatings between heated and polished rolls at, preferably, about 60° to 80° C., the magnetic coatings can then be smoothed and compressed. The thicknesses of the magnetic coatings amount generally to from 3 to 20, and especially 8 to 15 μm.

The iron oxide magnetic pigments treated in accordance with the invention are characterized by outstanding dispersibility and working qualities. It is surprising that, in spite of the great mechanical stress to which they are subjected in the dispersing procedure, they retain the qualities which they have been given by the silane treatment.

The magnetic pigment dispersions prepared with the treated iron oxide magnetic pigments have very good flow characteristics, and in addition permit a dense filling of magnetic coatings prepared therewith. Magnetic coatings prepared with them have a low-frequency modulability that is improved by as much as 25%, improved orientation factors as well as outstanding surface smoothness and improved resistance to wear.

In order to more fully illustrate the nature of the invention and the manner of practicing the same, the following examples are presented. In the Examples and Comparative Examples set forth below, the stated parts and percentages are by weight unless otherwise specified. Parts by volume relate to parts by weight as liters relate to kilograms.

EXAMPLES

EXAMPLE 1

100 grams of $\gamma$-Fe$_2$O$_3$ pigment are suspended by stirring in 400 ml of an ethanolic solution containing 40 grams of i-butyltrimethoxysilane and 36 grams of a 2% ammonia solution, refluxed for one hour, and allowed to cool. Then the silanized pigment is removed by filtration and dried for 4 hours at 130° C.

A small amount of the pretreated pigment is poured into a glass dish and a drop of water is placed on it. In contrast to the untreated pigment, the silanized product shows very good water-repellancy.

EXAMPLE 2

Similar results are obtained when Experiment 1 is performed with 40 grams of vinyltrimethoxysilane.

EXAMPLES 3 to 5

The following examples show the improved resistance to wear of iron oxide magnetic pigments when they are treated with silanes in accordance with the invention.

1000 grams of $\gamma$-Fe$_2$O$_3$ pigment are suspended in a 4% aqueous-alcoholic silane solution having a pH value of 3.5, and stirred for two hours. Then the treated pigment is filtered out and dried for two hours at 120° to 130° C. This pretreatment is performed with (a) $\gamma$-aminopropyltriethoxysilane and (b) with $\gamma$-glycidyloxypropyltrimethoxysilane. A standard epoxy resin is mixed with hardener and accelerator and divided into three parts. Treated and untreated $\gamma$-Fe$_2$O$_3$ pigment is added to these three resin specimens in such an amount as to achieve a fill of 33%.

| | | |
|---|---|---|
| Specimen 1: Filled with | Fe$_2$O$_3$ | untreated |
| Specimen 2: Filled with | " | pretreated with gamma-aminopropyltriethoxysilane. |
| Specimen 3: Filled with | " | pretreated with gamma-glycidyloxypropyltrimethoxysilane. |

In the incorporation of the pigments it is remarkable that the pigments pretreated with silanes can be worked into the resin substantially better and more rapidly than the unpretreated pigment. The dispersion is also much better.

The filled specimens are applied to degreased aluminum plates in a coating thickness of about 150 millimicrons and hardened for one hour at 130° C. The coatings on the three specimens are then subjected to the wear test in accordance with DIN No. 53799.

| Load: 0.5 kg | Wear in milligrams | | |
|---|---|---|---|
| Emery S 33 | Specimen 1 | Specimen 2 | Specimen 3 |
| After 100 revs. | 103 | 75 | 80 |
| After 200 revs. | 232 | 175 | 189 |
| After 300 revs. | 372 | 273 | 304 |
| After 400 revs. | 511 | 375 | 422 |

EXAMPLES 6 TO 10 AND COMPARATIVE EXPERIMENT A

These examples show the improved magnetic properties of the iron oxide magnetic pigments pretreated with silanes in accordance with the invention.

(a) Treatment of the Magnetic Pigments

In each of 5 batches (Examples 6 to 10), 1000 parts of a gamma iron oxide (powder values: Hc=25.4 (KA/m), R=40.9 (nTm$^3$/g; S=75.4 (nTm$^3$/g,=1.122 (g/cm$^3$) were suspended by means of a high-speed stirrer, three of them in a mixture of 5000 volume parts of water and 5000 volume parts of methanol (Examples 6 to 8) and two of them in 100,000 volume parts of water. In all cases, 50 parts of isobutyltrimethoxysilane (5%, with respect to the dry iron oxide) were added, and then, by the addition of aqueous ammonia solution or acetic acid, as the case may be, the following pH values were established in the suspensions:

Example 6: pH 8.7 (aqueous ammonia)
Example 7: pH 8.8 (aqueous ammonia)
Example 8: pH 3.1 (acetic acid)
Example 9: pH 8.9 (aqueous ammonia)
Example 10: pH 8.4 (aqueous ammonia).

Then the suspensions were stirred with a high-speed stirrer, each for 3 hours, at 60° C. (Example 6), at room temperature (Examples 7 to 9) and at 80° C. (Example 10). The treated iron oxides were then separated and dried for about 5 hours at about 180° C.

(b) Preparation and Testing of Magnetic Tapes

Using the iron oxide magnetic pigments treated as described above in Examples 6 to 10, and also using an untreated iron oxide magnetic pigment from the same production (Comparative Experiment A), magnetic tapes were prepared in 6 different batches, but all in the same manner, as follows:

In a steel ball mill, filled with 8000 parts of steel balls of a diameter of 4 to 6 mm, 900 parts of a type of treated iron oxide (Examples 6 to 10) or untreated iron oxide (Comparative Experiment A), were mixed with 450 parts of tetrahydrofuran and 450 parts of 1,4-dioxane in which 60 parts of a copolymer of vinyl chloride, dimethylmaleate and diethylmaleate had been dissolved, and, after the addition of 22.5 parts of soya lecithin, were dispersed for 40 hours. Then 140 parts of a commercial polyester urethane, dissolved in 540 parts of tetrahydrofuran and 540 parts of 1,4-dioxane as well as one part of stearic acid and one part of a silicone oil were added, and dispersion was continued for another three hours. After filtration of the dispersion, the latter is cast in a coating machine onto a 15 $\mu$m thick polyester film, and after magnetic treatment, the magnetic coating is dried at 55° to 90° C. After smoothing and compressing, the magnetic coating has a thickness of about 10 to 11 $\mu$m.

Table 1 gives the characteristics of the magnetic tapes:

TABLE 1

| Example No. | 6 | 7 | 8 | 9 | 10 | Comp. Exp. A |
|---|---|---|---|---|---|---|
| Coating thickness ($\mu$m) | 10.3 | 10.2 | 10.0 | 10.5 | 11.5 | 11.1 |
| H$_C$ (KA/m) | 24.7 | 24.7 | 24.9 | 24.3 | 24.3 | 24.3 |
| M$_R$ (mT) | 160 | 162 | 162 | 147 | 173 | 153 |
| RF | 2.39 | 2.37 | 2.40 | 2.49 | 2.45 | 2.20 |

TABLE 1-continued

| Example No. | 6 | 7 | 8 | 9 | 10 | Comp. Exp. A |
|---|---|---|---|---|---|---|
| $A_H$ (dB) | +0.2 | +0.6 | +0.2 | +0.7 | +0.4 | +0.1 |
| $A_T$ (dB) | +2.4 | +2.4 | +2.6 | +3.3 | +3.3 | +2.5 |
| $B_R$ (dB) | 62.3 | 62.2 | 62.0 | 62.2 | 62.0 | 62.4 |
| $K_O$ (dB) | 49.5 | 50.0 | 49.5 | 49.5 | 48.0 | 50.0 |

EXAMPLE 1 AND COMPARATIVE EXPERIMENT B 1000 parts of a finely divided iron oxide magnetic pigment (powder values: Hc 25.4 (KA/m), R 40.6 (nTm³/g), S 78.3 (nTm³/g); 1.138 (g/cm³) are suspended in ten times the amount of water and stirred with a high-speed stirrer. By the addition of dilute aqueous soda lye, a pH of 9.7 is established. Then 25 parts of isobutyltrimethoxysilane are added, and the mixture is stirred for another 3 hours at room temperature. The pigment is filtered out, washed with water to a pH of 7.6, and then the treated iron oxide is dried at 150° C. for about 4 to 5 hours. The resultant treated iron oxide pigment was not wetted by water.

Using the treated iron oxide pigment (Example 11), and untreated iron oxide from the same production batch in a separate lot, magnetic recording tapes were prepared as specified in Examples 6 to 10, and had the characteristics given in Table 2.

TABLE 2

|  | Example 11 | Comp. Exp. B |
|---|---|---|
| Coating thickness (in μm) | 10.8 | 10.7 |
| $H_C$ (Ka/m) | 25.3 | 25.6 |
| $M_R$ (mT) | 151 | 139 |
| $R_F$ | 2.31 | 2.08 |
| $A_H$ (dB) | +0.8 | +0.6 |
| $A_T$ (dB) | +2.5 | +1.2 |
| $B_R$ (dB) | 63.0 | 63.2 |
| $K_O$ (dB) | 48.0 | 48.0 |

EXAMPLES 12 to 14 AND COMPARATIVE EXPERIMENT C (a) Treatment of the magnetic pigments In each of three batches, 1000 parts of a finely divided gamma iron oxide magnetic pigment (powder values: $H_c$ 25.9, R 38.2; S 78.6; 1.133) were suspended in 6000 volume units of ethanol and stirred with a high-speed agitator. By the addition of dilute aqueous ammonia, a pH of approximately 8.5 is established. The following amounts of isobutyltrimethoxysilane were added to the individual batches: 1st batch (Example 12): 100 parts; 2nd Batch (Example 13): 50 parts, and 3rd batch (Example 14): 30 parts. All of the batches were then refluxed for one hour. The treated iron oxide magnetic pigment then removed by filtration is dried at 100° C. and 12 mm Torr.

(b) Preparation and Testing of the Magnetic Tapes

Using an iron oxide magnetic pigment treated as described above, and an untreated iron oxide magnetic pigment from the same production batch (Comparative Experiment C), magnetic tapes were made as follows in four different batches, but in the same manner:

1300 parts of an iron oxide pigment were ground in each case in a ball mill of a capacity of 15,000 parts by volume filled with approximately 15,000 parts of steel balls, together with a solution of 285 parts of a polyvinyl formal binder (vinyl formal unit content 83%, vinyl acetate unit content 12%, vinyl alcohol unit content 6%) in 3700 parts of a mixture of equal parts of tetrahydrofuran and dioxane with the addition of 20 parts of sodium oleate and 26.4 parts of a phthalic acid diisodecyl ester, until a sufficient surface smoothness was achieved as determined by spreading with a hand casting squeegee.

To the four different magnetic dispersions thus prepared, 18 parts of a medium-viscous silicone oil dissolved in 100 parts of the specified solvent mixture were added, and the resulting magnetic dispersions were filtered over a period of about 2 hours.

On a conventional coating machine, the magnetic dispersions thus prepared were each applied to a polyethylene terephthalate support film of 12 μm thickness and, after passing through a magnetic orientation field, was dried at 80° to 100° C. for 2 to 5 minutes. The magnetic coatings were smoothed and compressed with rolls. The finished magnetic coatings were approximatel 4 to 5 μm thick. The coated films were then cut into tapes of 6.25 to 3.81 mm width.

The characteristics of the four different types of magnetic tape are given in Table 3.

TABLE 3

| Example No. | 12 | 13 | 14 | Comp. Exp. C |
|---|---|---|---|---|
| Coating Thickness (μm) | 4.5 | 4.0 | 4.1 | 5.3 |
| $H_C$ (Ka/m) | 24.2 | 24.5 | 24.9 | 24.2 |
| MR (mT) | 141 | 150 | 137 | 119 |
| RF | 2.37 | 2.33 | 2.28 | 2.15 |

DEFINITIONS

Referring to Table 1, the abbreviations therein have the following meanings:
$H_C$(KA/m)=coercivity
$M_R$(mT)=remanence
RF=orientation factor
$A_H$(dB)=maximum output at 10 kHertz
$A_T$(dB)=maximum output at 333 Hertz
$B_R$(dB)=signal/noise ratio
$K_O$(dB)=print through

What is claimed is:

1. An iron oxide pigment having a coating of a silane of the formulla

$$R_nSi(OR')_{4-n}$$

wherein
R is a straight line or branched alkyl group having 1 to 18 carbon atoms or a straight or branched alkenyl group of 2 to 18 carbon atoms which alkyl or alkenyl group can contain an oxygen atom in the chain or an aryl group
R' is a straight or branched chain $C_1$–$C_{18}$ alkyl group which can contain an oxygen atom in the chain n=1 to 3 or a hydrolysis product thereof, the coated pigment produced by a process consisting essentially of suspending said iron oxide pigment in a composition consisting essentially of an organic or aqueous medium which medium contains a $C_1$–$C_4$ alcohol, a ketone or a chlorinated hydrocarbon, said medium also containing a silane of the formula

wherein
- R is a straight or branched alkyl group having 1 to 18 carbon atoms or a straight or branched alkenyl group of 2 to 18 carbon atoms which alkyl or alkenyl group can contain an oxygen atom in the chain or an aryl group
- R' is a straight or branched chain $C_1$–$C_{18}$ alkyl group which can contain an oxygen atom in the chain
- n = 1 to 3 or its hydrolysis product, until at least a portion of the surface of said iron pigment is coated with said silane or its hydrolysis product, and thereafter drying the so-treated iron oxide pigment at 50°–200° C.

2. An iron oxide pigment according to claim 1 wherein when R is aryl it is an aryl group of 6–8 carbocyclic carbon atoms.

3. An iron oxide pigment according to claim 1 wherein the iron oxide pigment is magnetic.

4. An iron oxide pigment according to claim 1 wherein the iron oxide pigment is acicular.

5. An iron oxide pigment according to claim 1 wherein the silane is a $C_1$–$C_6$ alkyl trimethoxy or triethoxy silane or a hydrolysis product thereof.

6. An iron oxide pigment according to claim 1 wherein the silane is glycidyloxypropyltrimethoxysilane or a hydrolysis product thereof.

7. An iron oxide pigment according to claim 1 wherein the silane is methacryloxyethyltriethoxysilane or a hydrolysis product thereof.

8. An iron oxide pigment according to claim 1 wherein the silane is $S_2[(CH_2)_3—Si(OH_3)_3]$ or a hydrolysis product thereof.

9. An iron oxide pigment according to claim 1 wherein said coating is present on said pigment in an amount between 0.5 and 40 weight percent with respect to the amount of iron oxide.

10. An iron oxide pigment according to claim 1 wherein the suspension has a pH of 2 to 6.

11. An iron oxide pigment according to claim 1 wherein the suspension has a pH of 7.5 to 10.

12. An iron oxide pigment according to claim 1 wherein the so-treated pigment is dried, following separation from the medium, at a temperature of 100° to 170° C.

13. An iron oxide pigment according to claim 1 wherein said silane is isobutyltrimethoxysilane.

14. An iron oxide pigment according to claim 1 wherein the iron oxide pigment is suspended in said composition in the absence of a binder.

15. An iron oxide pigment according to claim 1 wherein the iron oxide pigment is dried after it is removed from the aqueous or organic medium.

16. An iron oxide pigment according to claim 1 wherein the R moiety of the silane has a functional group reactable with a group of a magnetic tape binder.

17. An iron oxide pigment according to claim 16 wherein the functional group is amino, epoxy, mercapto, polysulfide or N-aminoalkyl.

18. An iron oxide pigment according to claim 1 wherein the amount of silane employed is between 0.5 and 40 weight percent, based on the amount of iron oxide pigment employed.

19. An iron oxide pigment according to claim 18 wherein the amount of iron oxide employed is between 5 and 150 percent by weight, based on the weight of the suspension.

20. An iron oxide pigment according to claim 1 wherein the suspension contains a base or acid.

21. An iron oxide pigment according to claim 20 wherein the base or acid is added to the suspension before or after the silane or hydrolysis product is introduced therein.

22. An iron oxide pigment according to claim 1 wherein the pigment is dried for at least ½ hour.

23. An iron oxide pigment according to claim 22 wherein the pigment is dried for 2 to 10 hours.

* * * * *

UNITED STATES PATENT AND TRADEMARK OFFICE
CERTIFICATE OF CORRECTION

PATENT NO. : 4,271,234
DATED : Jun. 2, 1981
INVENTOR(S) : Eduard Schönafinger et al It is certified that error appears in the above-identified patent and that said Letters Patent are hereby corrected as shown below:

Col. 9, line 19    Delete "8" and insert --18--.

Title Page         Delete "Nov. 2, 1996" and insert
Disclaimer         --Oct. 2, 1996--.
Notice Signed and Sealed this Tenth Day of November 1981

[SEAL]

Attest:

GERALD J. MOSSINGHOFF

Attesting Officer    Commissioner of Patents and Trademarks